US012620532B2

(12) United States Patent
Bang et al.

(10) Patent No.: US 12,620,532 B2
(45) Date of Patent: May 5, 2026

(54) MULTILAYER CERAMIC CAPACITOR AND MANUFACTURING METHOD THEREOF

(71) Applicant: SAMSUNG ELECTRO-MECHANICS CO., LTD., Suwon-si (KR)

(72) Inventors: Jaehoon Bang, Suwon-si (KR); Youngah Song, Suwon-si (KR); Bonggyu Choi, Suwon-si (KR); Kwang Dong Seong, Suwon-si (KR); Dokyeong Lee, Suwon-si (KR); Wansik Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 179 days.

(21) Appl. No.: 18/414,242

(22) Filed: Jan. 16, 2024

(65) Prior Publication Data

US 2025/0140479 A1    May 1, 2025

(30) Foreign Application Priority Data

Oct. 27, 2023    (KR) ........................ 10-2023-0145384

(51) Int. Cl.
*H01G 4/30* (2006.01)
*H01G 4/232* (2006.01)
(Continued)

(52) U.S. Cl.
CPC ............. *H01G 4/2325* (2013.01); *H01G 4/30* (2013.01); *H01G 4/0085* (2013.01); *H01G 4/1227* (2013.01)

(58) Field of Classification Search
CPC ...... H01G 4/2325; H01G 4/30; H01G 4/0085; H01G 4/1227; H01G 4/232; H01G 4/12;
(Continued)

(56) References Cited

U.S. PATENT DOCUMENTS

2005/0184278 A1* 8/2005 Miki ........................ H01B 1/16
                                                      252/500
2007/0057237 A1* 3/2007 Ohtani ...................... C03C 8/18
                                                      252/500
(Continued)

FOREIGN PATENT DOCUMENTS

JP        2004128328 A  * 4/2004
JP          4952723 B     6/2012
(Continued)

OTHER PUBLICATIONS

English Machine Translation of JP2004128328 (Year: 2004).*
English Machine Translation of JP7338554 (Year: 2023).*

*Primary Examiner* — Timothy J. Dole
*Assistant Examiner* — Esther N Lian
(74) *Attorney, Agent, or Firm* — Morgan, Lewis & Bockius LLP

(57) ABSTRACT

A multilayer ceramic capacitor and a method of manufacturing the same. The multilayer ceramic capacitor includes a capacitor body including a dielectric layer and an internal electrode layer; and an external electrode disposed outside the capacitor body. The external electrode includes a lower layer positioned on a cross-section of the capacitor body to be electrically connected to the internal electrode layer, and an upper layer to cover the lower layer and positioned on the lower layer. The lower layer includes a first glass including aluminum (Al) in an amount of more than 0 atom % to 8 atom % or less with respect to a total amount of components of the first glass. The upper layer includes a second glass including aluminum (Al) in an amount of 10 atom % or more to 20 atom % or less with respect to a total amount of components of the second glass.

20 Claims, 12 Drawing Sheets

(51) Int. Cl.
*H01G 4/008* (2006.01)
*H01G 4/12* (2006.01)

(58) Field of Classification Search
CPC ........ H01G 4/012; H01G 13/00; H01G 4/228;
C04B 35/468; Y02E 60/13
See application file for complete search history.

(56) References Cited

U.S. PATENT DOCUMENTS

| | | | | |
|---|---|---|---|---|
| 2009/0290281 | A1 | 11/2009 | Nagamoto et al. | |
| 2018/0290917 | A1* | 10/2018 | Nishimura | .............. C03C 3/068 |
| 2020/0090869 | A1* | 3/2020 | Iguchi | ...................... H01B 3/12 |
| 2020/0168400 | A1* | 5/2020 | Nakamoto | .............. H01G 4/30 |
| 2022/0189696 | A1* | 6/2022 | Yi | ........................... H01G 4/232 |
| 2022/0208460 | A1* | 6/2022 | Oh | ........................... H01G 4/30 |
| 2022/0270826 | A1* | 8/2022 | Tanaka | ................. H01G 4/1227 |
| 2023/0133669 | A1* | 5/2023 | Yoon | ......................... C03C 8/04 |
| | | | | 361/30 |
| 2023/0207214 | A1 | 6/2023 | Doi | |

FOREIGN PATENT DOCUMENTS

| | | | | | |
|---|---|---|---|---|---|
| JP | 2013048231 | A | * | 3/2013 | .............. H01G 4/12 |
| JP | 6911755 | B | | 7/2021 | |
| JP | 2023093942 | A | | 7/2023 | |
| JP | 7338554 | B2 | * | 9/2023 | ............. H01G 4/008 |
| KR | 20230092407 | A | * | 6/2023 | ............. H01G 4/012 |

\* cited by examiner

FIG. 4

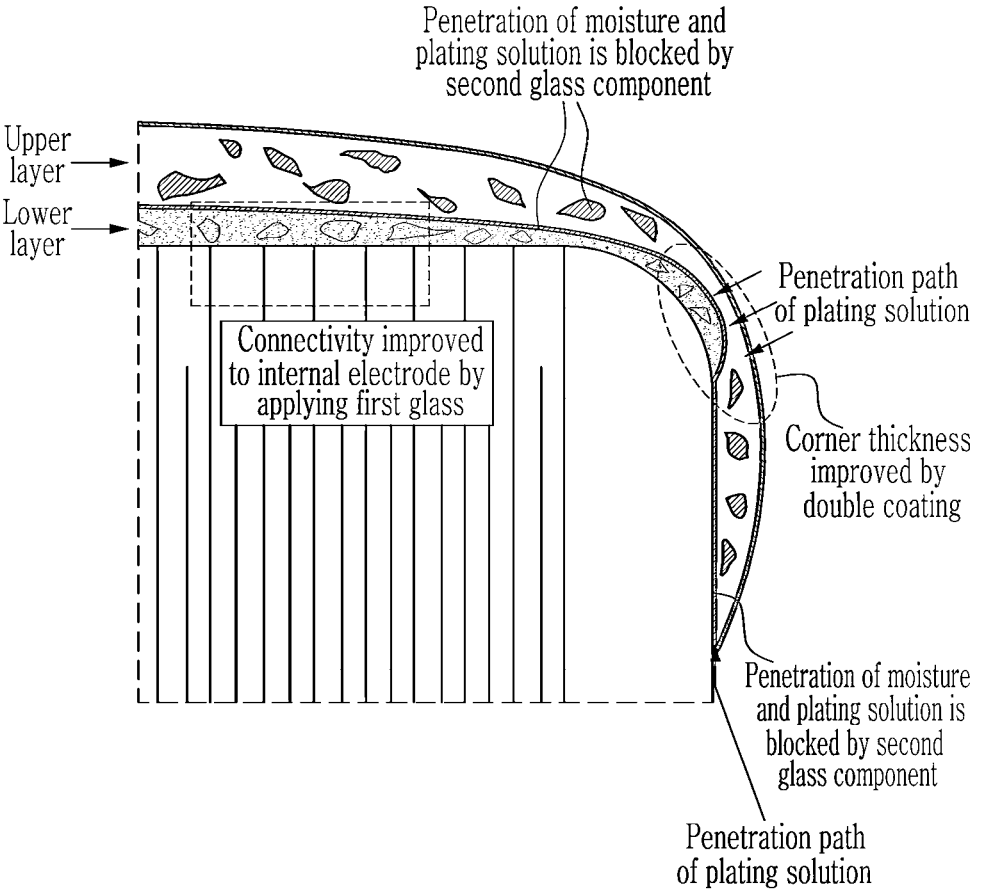

Penetration of moisture and plating solution is blocked by second glass component Upper layer Lower layer Connectivity improved to internal electrode by applying first glass Penetration path of plating solution Corner thickness improved by double coating Penetration of moisture and plating solution is blocked by second glass component Penetration path of plating solution Time(hr)

Time(hr)

MULTILAYER CERAMIC CAPACITOR AND MANUFACTURING METHOD THEREOF

CROSS-REFERENCE TO RELATED APPLICATION

This application claims priority to and the benefit of Korean Patent Application No. 10-2023-0145384 filed in the Korean Intellectual Property Office on Oct. 27, 2023, the entire contents of which is incorporated herein by reference.

BACKGROUND

(a) Technical Field

The present disclosure relates to a multilayer ceramic capacitor and a manufacturing method thereof.

(b) Description of the Related Art

As electronic components using a ceramic material, there are a capacitor, an inductor, a piezoelectric element, a varistor, a thermistor, and the like. Among ceramic electronic components, a multilayer ceramic capacitor (MLCC) may be used in various electronic devices due to advantages such as a small size, a high capacitance, an easy mounting feature, and the like.

For example, a multilayer ceramic capacitor may be used in a chip type condenser mounted on a board of several electronic products such as image devices, for example, liquid crystal displays (LCD), plasma display panels (PDP), or the like, computers, personal portable terminals, smartphones, and the like, to serve to charge or discharge electricity therein or therefrom.

Recently, with the miniaturization of electronic products, multilayer ceramic capacitors are also required to be miniaturized and to have ultra-high capacitance. For this purpose, the thickness of the dielectric layer and internal electrode layer is reduced, and a multilayer ceramic capacitor having a structure in which a greater number of dielectric layers and internal electrode layers are stacked is being developed. These ultra-small and ultra-high-capacitance multilayer ceramic capacitors are recently used in fields that require a high level of reliability, such as electric vehicles, and accordingly, high reliability is required for such capacitors.

SUMMARY

An embodiment attempts to provide a multilayer ceramic capacitor having an excellent reliability.

Another embodiment attempts to provide a method of manufacturing a multilayer ceramic capacitor.

A multilayer ceramic capacitor may include a capacitor body including a dielectric layer and an internal electrode layer, and an external electrode disposed outside the capacitor body, where the external electrode includes a lower layer positioned on a cross-section of the capacitor body to be electrically connected to the internal electrode layer, and an upper layer to cover the lower layer and positioned on the lower layer, where the lower layer includes a first glass that may include aluminum (Al) in an amount of more than 0 atom % to 8 atom % or less with respect to a total amount of components of the first glass, and where the upper layer includes a second glass that may include aluminum (Al) in an amount of 10 atom % or more to 20 atom % or less with respect to a total amount of components of the second glass.

A ratio of the amount of aluminum (Al) included in the second glass to the amount of aluminum (Al) included in the first glass may be more than 2 to 100 or less.

The second glass may further include lithium (Li), sodium (Na), iron (Fe), barium (Ba), calcium (Ca), zinc (Zn), boron (B), silicon (Si), tin (Sn) or a combination thereof.

The second glass may include silicon (Si), and a sum of components of aluminum (Al) and silicon (Si) is 20 atom % to 50 atom % with respect to the total amount of components of the second glass.

The first glass may further include lithium (Li), sodium (Na), iron (Fe), barium (Ba), calcium (Ca), zinc (Zn), boron (B), silicon (Si), tin (Sn) or a combination thereof.

The first glass may include barium (Ba) and zinc (Zn), and a sum of components of barium (Ba) and zinc (Zn) is 50 atom % to 95 atom % with respect to the total amount of components of the first glass.

The first glass and the second glass may further include sodium (Na), and an atomic ratio of sodium (Na) included in the second glass to sodium (Na) included in the first glass may be more than 2 to 100 or less.

The first glass and the second glass may further include iron (Fe), and an atomic ratio of iron (Fe) included in the second glass to iron (Fe) included in the first glass may be more than 2 to 100 or less.

At least one of the lower layer and the upper layer may further include a conductive metal.

The conductive metal may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof.

The external electrode may include (i) a central portion that includes a central point of a length of the multilayer ceramic capacitor in thickness direction and (ii) a corner portion that includes a corner point of the multilayer ceramic capacitor, and a thickness ratio of corner portion compared to central portion of the external electrode may be 0.1 to 0.5.

The second glass may include lithium (Li).

The first glass may further include lithium (Li), and an atomic ratio of lithium (Li) included in the second glass to lithium (Li) included in the first glass is more than 1.

A method of manufacturing a multilayer ceramic capacitor may include applying a first paste for forming a lower layer of an external electrode to a surface of a capacitor body including a dielectric layer and an internal electrode layer, the lower layer including a first glass, forming the lower layer by sintering the first paste, applying a second paste for forming an upper layer of the external electrode on the lower layer of the external electrode, the upper layer including a second glass, and forming the upper layer by sintering the second paste, where the first paste includes a first glass composition that forms a first glass, and the first glass composition may include aluminum oxide ($Al_2O_3$) in an amount of more than 0 parts by mole to 8 parts by mole or less with respect to a total amount of 100 parts by mole of the first glass composition, and where the second paste includes a second glass composition that forms a second glass, and the second glass composition may include aluminum oxide ($Al_2O_3$) in an amount of 10 parts by mole or more to 20 parts by mole or less with respect to a total amount of 100 parts by mole of the second glass composition.

A method of manufacturing a multilayer ceramic capacitor may include applying a first paste for forming a lower layer of an external electrode to a surface of a capacitor body including a dielectric layer and an internal electrode layer, the lower layer including a first glass, applying a second paste for forming an upper layer of the external electrode on the first paste, the upper layer including a second glass, and forming the external electrode including the lower layer and the upper layer by sintering the capacitor body applied with the first paste and the second paste, where the first paste includes a first glass composition that forms a first glass, and the first glass composition may include aluminum oxide ($Al_2O_3$) in an amount of more than 0 parts by mole to 8 parts by mole or less with respect to a total amount of 100 parts by mole of the first glass composition, and where the second paste includes a second glass composition that forms a second glass, and the second glass composition may include aluminum oxide ($Al_2O_3$) in an amount of 10 parts by mole or more to 20 parts by mole or less with respect to a total amount of 100 parts by mole of the second glass composition.

The first glass composition may further include barium oxide (BaO), calcium oxide (CaO), zinc oxide (ZnO), boron oxide ($B_2O_3$), silicon dioxide ($SiO_2$), or a combination thereof.

With respect to the total amount of 100 parts by mole of the first glass composition, barium oxide (BaO) may be included in an amount of 10 parts by mole to 40 parts by mole, calcium oxide (CaO) may be included in an amount of 1 part by mole to 20 parts by mole, zinc oxide (ZnO) may be included in an amount of 10 parts by mole to 40 parts by mole, boron oxide ($B_2O_3$) may be included in an amount of 10 parts by mole to 40 parts by mole, and silicon dioxide ($SiO_2$) may be included in an amount of 1 part by mole to 20 parts by mole.

The second glass composition may further include lithium oxide ($Li_2O$), sodium oxide ($Na_2O$), barium oxide (BaO), calcium oxide (CaO), zinc oxide (ZnO), boron oxide ($B_2O_3$), silicon dioxide ($SiO_2$), iron oxide ($Fe_2O_3$), or a combination thereof.

With respect to the total amount of 100 parts by mole of the second glass composition, lithium oxide ($Li_2O$) may be included in an amount of 1 part by mole to 20 parts by mole, sodium oxide ($Na_2O$) may be included in an amount of 1 part by mole to 20 parts by mole, barium oxide (BaO) may be included in an amount of 10 parts by mole to 40 parts by mole, calcium oxide (CaO) may be included in an amount of 1 part by mole to 20 parts by mole, zinc oxide (ZnO) may be included in an amount of 1 part by mole to 20 parts by mole, boron oxide ($B_2O_3$) may be included in an amount of 10 parts by mole to 40 parts by mole, silicon dioxide ($SiO_2$) may be included in an amount of 1 part by mole to 20 parts by mole, and iron oxide ($Fe_2O_3$) may be included in an amount of 0.1 part by mole to 10 parts by mole.

At least one of the paste for forming the lower layer and the paste for forming the upper layer may further include a conductive metal.

A multilayer ceramic capacitor according to an embodiment may have improved reliability by including an external electrode with show excellent contact with the internal electrode, corrosion resistance and moisture endurance reliability.

BRIEF DESCRIPTION OF THE DRAWINGS

FIG. 4 is a schematic diagram showing an external electrode of a multilayer ceramic capacitor according to an embodiment.

DETAILED DESCRIPTION

Figure 1:
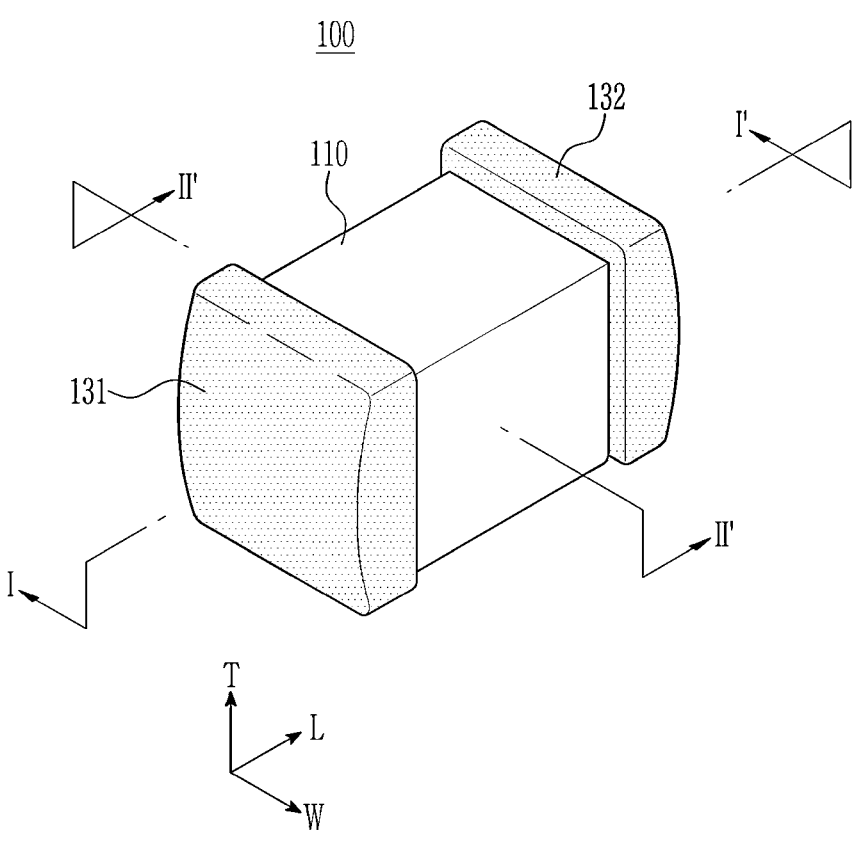
FIG. 1 is a perspective view showing a multilayer ceramic capacitor according to an embodiment.

Hereinafter, the present disclosure will be described in detail hereinafter with reference to the accompanying drawings, in which embodiments of the present disclosure are shown. The drawings and description are to be regarded as illustrative in nature and not restrictive. Like reference numerals designate like elements throughout the specification. In the accompanying drawings, some components are exaggerated, omitted, or schematically illustrated, and the size of each component does not entirely reflect the actual size.

The accompanying drawings are intended only to facilitate an understanding of the exemplary embodiments disclosed in this specification, and it is to be understood that the technical ideas disclosed herein are not limited by the accompanying drawings and include all modifications, equivalents, or substitutions that are within the range of the ideas and technology of the present disclosure.

Although terms of "first," "second," and the like are used to explain various components, the components are not limited to such terms. These terms are only used to distinguish one component from another component.

In addition, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is referred to as being "on" or "above" a reference element, it can be positioned above or below the reference element, and it is not necessarily referred to as being positioned "on" or "above" in a direction opposite to gravity.

Throughout the specification, the terms "comprise" or "have" are intended to specify the presence of stated features, integers, steps, operations, components, components or a combination thereof, but do not preclude the presence or addition of one or more other features, integers, steps, operations, components, components, and/or groups thereof. Therefore, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Throughout the specification, the term "connected" does not mean only that two or more constituent components are directly connected, but may also mean that two or more constituent components are indirectly connected through another constituent component, that two or more components are electrically connected as well as physically connected, or that two or more constituent components are referred to by different names but are united by location or function.

Hereinafter, a multilayer ceramic capacitor according to an embodiment will be described with reference to FIG. 1 to FIG. 4.

Figure 2:
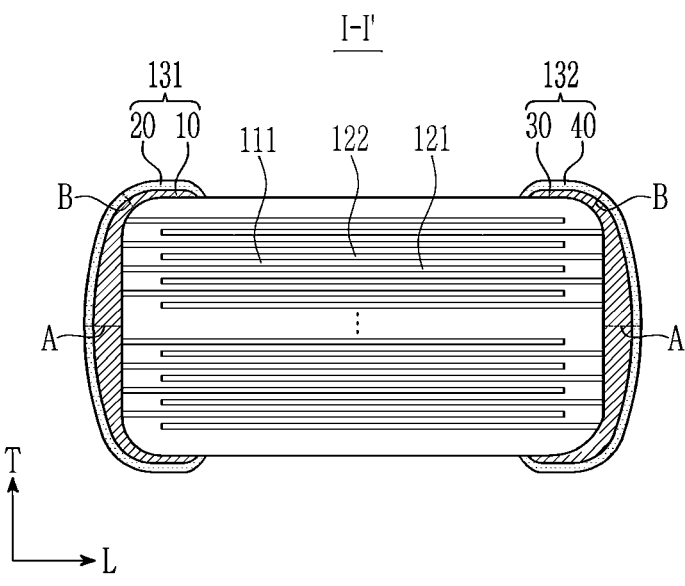
FIG. 2 is a cross-sectional view of a multilayer ceramic capacitor taken along line I-I' in FIG. 1.
Figure 3:
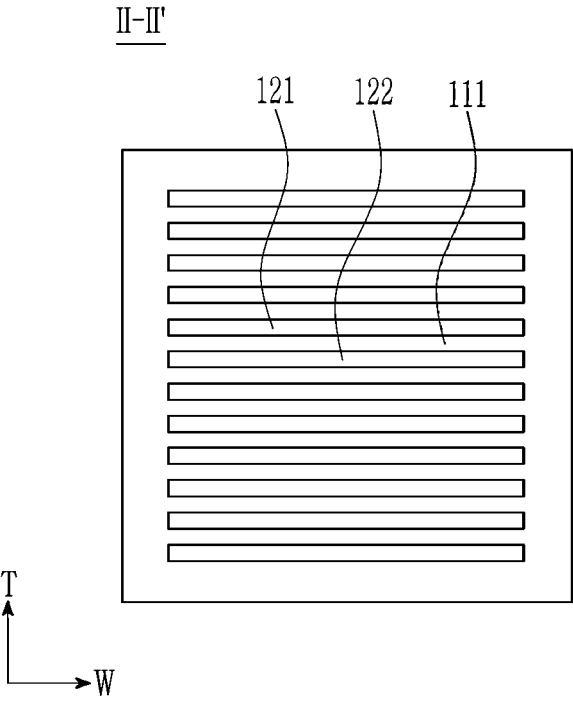
FIG. 3 is a cross-sectional view of a multilayer ceramic capacitor taken along line II-II' in FIG. 1.

FIG. 1 is a perspective view showing a multilayer ceramic capacitor according to an embodiment. FIG. 2 is a cross-sectional view of a multilayer ceramic capacitor taken along line I-I' in FIG. 1. FIG. 3 is a cross-sectional view of a multilayer ceramic capacitor taken along line II-II' in FIG. 1. FIG. 4 is a schematic diagram showing an external electrode of a multilayer ceramic capacitor according to an embodiment.

The L-axis, W-axis, and T-axis shown in FIG. 1 to FIG. 3 represent a length direction, a width direction, and a thickness direction of a capacitor body 110, respectively. Here, the thickness direction (T-axis direction) may be a direction perpendicular to the wide surface (main surface) of the sheet-shaped components, and may be used as the same concept as a stacking direction in which a dielectric layer 111 are stacked, for example. The longitudinal direction (L-axis direction) may be a direction extending parallel to the wide surface (main surface) of the sheet-shaped components, and may be approximately perpendicular to the thickness direction (T-axis direction). For example, the longitudinal direction (L-axis direction) may be the direction in which a first external electrode 131 and a second external electrode 132 are positioned on both sides. The width direction (W-axis direction) may be a direction extending parallel to the wide surface (main surface) of the sheet-shaped components, and may be approximately perpendicular to the thickness direction (T-axis direction) and the longitudinal direction (L-axis direction). The length of the sheet-shaped components in the longitudinal direction (L-axis direction) may be longer than the length in the width direction (W-axis direction).

Referring to FIG. 1 to FIG. 4, a multilayer ceramic capacitor 100 according to an embodiment includes the capacitor body 110 and external electrodes 131 and 132 disposed outside the capacitor body 110. The external electrodes 131 and 132 may include a first external electrode 131 and a second external electrode 132 disposed at opposite ends of the capacitor body 110 in the longitudinal direction (L-axis direction).

For example, the capacitor body 110 may have a roughly hexahedral shape.

For convenience of description of an embodiment, the two surfaces opposing each other in the thickness direction (T-axis direction) of the capacitor body 110 are referred to as first and second surfaces, the two surfaces connected to the first and second surfaces and opposing each other in the longitudinal direction (L-axis direction) are referred to as third and the fourth surfaces, and two surfaces connected to the first and second surfaces and to the third and fourth surfaces, and opposing each other in the width direction (W-axis direction) are referred to as the fifth and sixth surfaces.

As an example, the first surface, which is the lower surface, may be a surface facing the mounting direction. Additionally, the first to the sixth surfaces may be flat, but the embodiment is not limited thereto. For example, the first to the sixth surfaces may be curved surfaces with a convex central portion, and the edges, which are the boundaries of each surface, may be rounded.

The shape and size of the capacitor body 110 and the number of stacks of the dielectric layers 111 are not limited to those shown in the drawings of the embodiment.

The capacitor body 110 includes a plurality of dielectric layers 111 and internal electrode layers 121 and 122. Specifically, the capacitor body 110 includes the plurality of dielectric layers 111 and a first internal electrode 121 and a second internal electrode 122 alternately arranged in the thickness direction (T-axis direction) interposing the dielectric layer 111.

A detailed description with respect to the capacitor body 110 will be provided later.

External Electrode

Referring to FIG. 2 and FIG. 4, the external electrodes 131 and 132, that is, the first external electrode 131 and the second external electrode 132 are provided with voltages of different polarities, and may be electrically connected to exposed portions of the first internal electrode 121 and the second internal electrode 122, respectively.

According to the above configuration, when a predetermined voltage is to the first external electrode 131 and the second external electrode 132, charges are accumulated between the first internal electrode 121 and the second internal electrode 122 facing each other. At this time, the capacitance of the multilayer ceramic capacitor 100 is proportional to the overlapping area of the first internal electrode 121 and the second internal electrode 122 that overlap each other along the T-axis direction in the active region.

The first external electrode 131 and the second external electrode 132 may include, respectively, first and second connection portions disposed on the third and fourth surfaces of the capacitor body 110 and connected to the first internal electrode 121 and the second internal electrode 122, and first and second band portions disposed on edges where the third and fourth surfaces of the capacitor body 110 meet the first and second surfaces or the fifth and sixth surfaces.

The first and second band portions may extend, respectively, from the first and second connection portions to portions of the first and second surfaces of the capacitor body 110 or the fifth and sixth surfaces. The first and second band portions may serve to improve the adhesion strength of the first external electrode 131 and the second external electrode 132.

The external electrodes 131 and 132 include lower layers 10 and 30 positioned on cross-section of the capacitor body 110 to be electrically connected to at least one of the internal electrode layers 121 and 122, and upper layers 20 and 40 configured to cover the lower layers 10 and 30 and positioned on the lower layers 10 and 30. Specifically, the first external electrode 131 includes a first lower layer 10 positioned on cross-section of the capacitor body 110 to be electrically connected to the first internal electrode 121, and a first upper layer 20 configured to cover the first lower layer 10 and positioned on the first lower layer 10. In addition, the second external electrode 132 includes a second lower layer 30 positioned on cross-section of the capacitor body 110 to be electrically connected to the second internal electrode 122, and a second upper layer 40 configured to cover the second lower layer 30 and positioned on the second lower layer 30.

The lower layers 10 and 30 and the upper layers 20 and 40 may include glass having different compositions. When the external electrode is formed in at least two layers, and at this time, each layer includes a glass component of different compositions, an external electrode of which not only the contact with the internal electrode is excellent but corrosion resistance and moisture endurance reliability are also excellent by preventing the penetration of moisture and plating solution may be secured. Accordingly, a multilayer ceramic capacitor having improved reliability may be implemented.

The lower layers 10 and 30 may include first glass, and the first glass may include aluminum (Al). In addition, the upper layers 20 and 40 may include second glass, and the second glass may include aluminum (Al).

In more detail, aluminum (Al) included in the lower layers 10 and 30 may be included in an amount of more than 0 to 8 or less atom % based on a total amount of components of the first glass, and may be included, for example, in 0.1 atom % to 7.9 atom %, for further example, in 0.5 atom % to 7.7 atom %. In addition, aluminum (Al) included in the upper layers 20 and 40 may be included in an amount of 10 or more atom % to 20 or less atom % based on a total amount of components of the second glass, and may be included, for example, in 11 atom % to 19 atom %, for further example 12 atom % to 18 atom %. When each of the lower layers 10 and 30 and the upper layers 20 and 40 includes aluminum (Al) within the content range as the glass component, an external electrode of which not only the contact with the internal electrode is excellent but corrosion resistance and moisture endurance reliability are also excellent by preventing the penetration of moisture and plating solution may be secured. A multilayer ceramic capacitor including such an external electrode may have improved reliability.

As an example, aluminum (Al) included in the second glass of the upper layers 20 and 40 may have an atomic ratio of more than 2 to 100 or less compared to aluminum (Al) included in the first glass of the lower layers 10 and 30, and may have, for example, an atomic ratio of 3 to 80. When the atomic ratio of aluminum (Al) included in each of the lower layers 10 and 30 and the upper layers 20 and 40 is within the above range, an external electrode of which contact with the internal electrode is excellent and corrosion resistance and moisture endurance reliability are excellent may be secured, and accordingly, reliability of a multilayer ceramic capacitor may be improved.

Aluminum (Al) included in the first glass and aluminum (Al) included in the second glass may be components derived from aluminum oxide added to a paste for forming the lower layer and a paste for forming the upper layer when forming the external electrode, respectively.

The first glass of the lower layers 10 and 30 may further include lithium (Li), sodium (Na), iron (Fe), barium (Ba), calcium (Ca), zinc (Zn), boron (B), silicon (Si), tin (Sn) or a combination thereof, as well as aluminum (Al).

Lithium (Li), sodium (Na) and iron (Fe) that may be included in the first glass may be components derived from lithium oxide ($Li_2O$), sodium oxide ($Na_2O$) and iron oxide ($Fe_2O_3$) added to the paste for forming the upper layer when forming the external electrode, respectively. That is, the additives may be components partially diffused into the lower layer while forming the upper layer. In addition, barium (Ba), calcium (Ca), zinc (Zn), boron (B) and silicon (Si) that may be included in the first glass may be component derived from barium oxide (BaO), calcium oxide (CaO), zinc oxide (ZnO), boron oxide ($B_2O_3$) and silicon dioxide ($SiO_2$) added to the paste for forming the lower layer applied when forming the external electrode, respectively.

As an example, the first glass may include aluminum (Al), barium (Ba) and zinc (Zn). In addition, the first glass may be Ba/Zn-based glass in which the sum of components of barium (Ba) and zinc (Zn) occupies the largest portion of the total components of the first glass. For example, the sum of components of barium (Ba) and zinc (Zn) may be 50 atom % to 95 atom % based on the total amount of components of the first glass, and may be 55 atom % to 90 atom %. When the first glass has a composition within the above range, an external electrode having an excellent connectivity, i.e., contact, with the internal electrode may be obtained.

The second glass of the upper layers 20 and 40 may further include lithium (Li), sodium (Na), iron (Fe), barium (Ba), calcium (Ca), zinc (Zn), boron (B), silicon (Si), tin (Sn) or a combination thereof, as well as aluminum (Al).

Lithium (Li), sodium (Na) and iron (Fe) that may be included in the second glass may be components derived from lithium oxide ($Li_2O$), sodium oxide ($Na_2O$) and iron oxide ($Fe_2O_3$) added to the paste for forming the upper layer when forming the external electrode, respectively. In addition, barium (Ba), calcium (Ca), zinc (Zn), boron (B) and silicon (Si) that may be included in the second glass may be component derived from barium oxide (BaO), calcium oxide (CaO), zinc oxide (ZnO), boron oxide ($B_2O_3$) and silicon dioxide ($SiO_2$) added to the paste for forming the upper layer applied when forming the external electrode, respectively.

As an example, the second glass may include aluminum (Al) and silicon (Si). In addition, the second glass may be Al/Si-based glass in which the sum of components of aluminum (Al) and silicon (Si) occupies a major portion of the total components of the second glass. For example, the sum of components of aluminum (Al) and silicon (Si) may be 20 atom % to 50 atom % based on the total amount of components of the second glass, and may be 22 atom % to 40 atom %. When the second glass has a composition within the above range, an external electrode of which corrosion resistance and moisture endurance reliability are excellent may be obtained.

When forming the external electrode, in the case that Ba/Zn-based glass is used alone, reliability may not be guaranteed because it may be eroded by plating solution despite of excellent contact with the internal electrode, and in the case that Al/Si-based glass is used alone, contact failure with respect to internal electrode may occur due to poor contact with metal despite excellent reliability due to strong corrosion resistance with respect to plating solution. According to an embodiment, by forming the external electrode as at least two layers including a lower layer corresponding to Ba/Zn-based glass and an upper layer corresponding to Al/Si-based glass, an external electrode of which not only the contact with the internal electrode but also corrosion resistance and moisture endurance reliability with respect to plating solution are all excellent may be secured. Therefore, a multilayer ceramic capacitor having an excellent reliability may be implemented.

In addition, for example, the first glass of the lower layers 10 and 30 and the second glass of the upper layers 20 and 40 may include sodium (Na). In this case, sodium (Na) included in the second glass may have an atomic ratio of more than 2 to 100 or less compared to sodium (Na) included in the first glass, and may have, for example, an atomic ratio of 3 to 80. When the atomic ratio of sodium (Na) included in each of the lower layers 10 and 30 and the upper layers 20 and 40 is within the above range, an external electrode of which contact with the internal electrode is excellent and corrosion resistance and moisture endurance reliability are excellent may be secured.

As an example, the first glass of the lower layers 10 and 30 and the second glass of the upper layers 20 and 40 may include iron (Fe). In this case, iron (Fe) included in the second glass may have an atomic ratio of more than 2 to 100 or less compared to iron (Fe) included in the first glass, and may have, for example, an atomic ratio of 3 to 80. When the atomic ratio of sodium (Na) included in each of the lower layers 10 and 30 and the upper layers 20 and 40 is within the above range, an external electrode of which contact with the internal electrode is excellent and corrosion resistance and moisture endurance reliability are excellent may be secured.

It may be confirmed by scanning electron microscope (SEM) analysis that the external electrodes 131 and 132 according to an embodiment are formed including the lower layers 10 and 30 and the upper layers 20 and 40.

SEM analysis may be measured in the following method. The multilayer ceramic capacitor 100 may be placed in an epoxy mixture liquid and cured, then polished by using sand paper and diamond suspension, such that a cross-sectional sample having a LT surface to enable observation of the external electrode may be obtained. Subsequently, the obtained cross-sectional sample may be measured by scanning electron microscope (SEM). SEM may be measured, for example, by using Tescan's Vega3, under the condition of 20 kV, 0.2 nA, and analysis magnification of 3 k times.

In addition, composition of components included in the above-mentioned lower layers 10 and 30 and the upper layers 20 and 40, in more detail, atom % and atomic ratio of aluminum (Al), silicon (Si), barium (Ba), zinc (Zn), sodium (Na), iron (Fe), or the like in each layer may be confirmed by scanning electron microscope-energy dispersive spectroscopy (SEM-EDS) analysis or electron probe micro-analyzer (EPMA). Other methods and/or tools appreciated by one of ordinary skill in the art, even if not described in the present disclosure, may also be used.

SEM-EDS analysis may be performed in the following method. First, a cross-sectional sample may be obtained from the multilayer ceramic capacitor 100 by the above-mentioned method. Subsequently, the obtained cross-sectional sample may be measured by scanning electron microscope (SEM). SEM may be measured, for example, by using Tescan's Vega3, under the condition of 20 KV, 0.2 nA, and analysis magnification of 6005 times. Subsequently, energy dispersive spectroscopy (EDS) analysis may be performed on the SEM image of the measured cross-sectional sample, to confirm the content of each component present in the lower layer and upper layer of the external electrode.

In addition, EPMA may be performed in the following method. First, a cross-sectional sample may be obtained from the multilayer ceramic capacitor 100 by the above-mentioned method. Electron probe micro-analyzer (EPMA) analysis may be measured on the obtained cross-sectional sample under the condition of a voltage of 15 kV and 10 k magnification, and mapping and content of each element existing in the lower layer and the upper layer of the external electrode may be confirmed.

The lower layers 10 and 30 and the upper layers 20 and 40 may be sintered metal layers of the external electrode.

At least one of the lower layers 10 and 30 and the upper layers 20 and 40 may further include a conductive metal. That is, one of the lower layers 10 and 30 and the upper layers 20 and 40 may include the conductive metal, and all of the lower layers 10 and 30 and the upper layers 20 and 40 may include the conductive metal.

The conductive metal may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, may include copper (Cu) or a copper (Cu) alloy.

When the conductive metal includes copper (Cu), metals other than copper (Cu) may be included in an amount of 5 parts by mole or less with respect to 100 parts by mole of copper (Cu).

The conductive metal included in the lower layers 10 and 30 may be included in an amount of 80 wt % to 99 wt % based on the total amount of lower layer, and the conductive metal included in the upper layers 20 and 40 may be included an amount of 80 wt % to 99 wt % based on the total amount of the upper layer.

As shown in FIG. 2, in the external electrodes 131 and 132, a central point in a length of the multilayer ceramic capacitor 100 in the thickness direction (T-axis direction) may be referred to a central portion A, and a corner point of the multilayer ceramic capacitor 100 may be referred to as a corner portion B. That is, the central portion A may be a central point of the length of the third surface and the fourth surface, and the corner portion B may be a point where three surfaces meet.

Since the corner portion B of the external electrodes 131 and 132 according to an embodiment includes the lower layers 10 and 30 and the upper layers 20 and 40, that is, forms at least a bilayer, the thickness of the corner portion B may be increased. The corner portion B may be one of penetration paths of the plating solution. According to an embodiment, by increasing the thickness of the corner portion B, penetration of plating solution may be blocked, and accordingly, corrosion resistance and moisture endurance reliability may be improved.

As an example, thickness ratio of the corner portion B compared to the central portion A of the external electrodes 131 and 132 may be 0.1 to 0.5, and for example, may be 0.15 to 0.45. When the thickness ratio of the corner portion B compared to the central portion A of the external electrodes 131 and 132 is within the above range, corrosion resistance and moisture endurance reliability may be improved.

The thicknesses of the central portion A and the corner portion B of the external electrodes 131 and 132 may be measured by scanning electron microscope (SEM) analysis. SEM analysis may be performed in the same way as the SEM analysis method for confirming the formation of the lower layers 10 and 30 and the upper layers 20 and 40, as described above. Other methods and/or tools appreciated by one of ordinary skill in the art, even if not described in the present disclosure, may also be used.

The external electrodes 131 and 132 may further include a conductive resin layer disposed on the upper layers 20 and 40 so as to cover the above-mentioned lower layers 10 and 30 and the upper layers 20 and 40, and a plating layer disposed so as to cover the conductive resin layer.

The conductive resin layer extends to the first and second surfaces or the fifth and sixth surfaces of the capacitor body 110, and the length of the region (i.e., band portion) where the conductive resin layer is extended and disposed to the first and second surfaces or the fifth and sixth surfaces of the capacitor body 110 may be longer than the length of the region (i.e., band portion) where the upper layers 20 and 40 are extended and disposed to the first and second surfaces or the fifth and sixth surfaces of the capacitor body 110. That is, conductive resin layer may be formed on the upper layers 20 and 40, and may be formed in a form that completely covers the upper layers 20 and 40.

The conductive resin layer may include resin and conductive metal.

The resin included in the conductive resin layer may be implemented by a material which has adhesive properties and shock absorption properties and is able to form a paste when mixed with the conductive metal powder, but is not limited thereto. For example, the resin may include phenolic resin, acrylic resin, silicone resin, epoxy resin, or polyimide resin.

The conductive metal included in the conductive resin layer serves to be electrically connected to the internal electrode layers 121 and 122, or the lower layers 10 and 30 and the upper layers 20 and 40.

The conductive metal included in the conductive resin layer may have a spherical shape, a flake shape, or a combination thereof. That is, the conductive metal may be formed only in flake form, only in spherical form, or in a mixed form of flake form and spherical form.

Here, the spherical shape may also include a shape that is not a perfect spherical shape, for example, a shape in which the length ratio of the major axis and the minor axis (major axis/minor axis) is 1.45 or less. Flake shape powder refers to a powder with a flat and elongated shape, and is not particularly limited. But for example, the length ratio of the major axis and the minor axis (major axis/minor axis) may be 1.95 or more.

The plating layer may include nickel (Ni), copper (Cu), tin (Sn), palladium (Pd), platinum (Pt), gold (Au), silver (Ag), tungsten (W), titanium (Ti), or lead (Pb), either alone or in an alloy thereof. For example, the plating layer may be a nickel (Ni) plating layer or a tin (Sn) plating layer, may be a form in which the nickel (Ni) plating layer and the tin (Sn) plating layer are sequentially stacked, or may be a form in which the tin (Sn) plating layer, the nickel (Ni) plating layer, and the tin (Sn) plating layer are sequentially stacked. Additionally, the plating layer may include a plurality of nickel (Ni) plating layers and/or a plurality of tin (Sn) plating layers.

The plating layer may improve mountability to the substrate, structural reliability, durability to the outside, heat resistance, and equivalent series resistance (ESR) of the multilayer ceramic capacitor 100.

Capacitor Body

The capacitor body 110 includes a plurality of dielectric layers 111 and internal electrode layers 121 and 122. Specifically, the capacitor body 110 includes the plurality of dielectric layers 111 and the first internal electrode 121 and the second internal electrode 122 alternately arranged in the thickness direction (T-axis direction) interposing the dielectric layer 111.

At this time, the boundaries between adjacent dielectric layers 111 of the capacitor body 110 may be integrated to the extent that it is difficult to check without using a scanning electron microscope (SEM).

The capacitor body 110 may include the active region. The active region is a part that contributes to forming the capacitance of the multilayer ceramic capacitor 100. Specifically, the active region may be a region where the first internal electrode 121 or the second internal electrode 122 stacked along the thickness direction (T-axis direction) overlap.

In addition, the capacitor body 110 may further include a cover region and a side margin region.

The cover region is a thickness direction marginal portion, and may be positioned on the first and second surfaces of the active region in the thickness direction (T-axis direction), respectively. This cover part may be a single dielectric layer 111 or two or more dielectric layers 111 stacked on the upper and lower surfaces of the active region, respectively.

The side margin region is a width direction marginal portion, and may be positioned on the fifth surface and the sixth surface of the active region in the width direction (W-axis direction). The side margin region may be formed according as, when the conductive paste layer for the internal electrode is applies on a surface of a dielectric green sheet, the dielectric green sheets, which are applied with the conductive paste layer only in a partial region of the surface of the dielectric green sheet and not applied with the conductive paste layer on both side surfaces of the surface of the dielectric green sheet, are stacked and then fired.

The cover region and the side marginal portion 140 serve to prevent damage to the first internal electrode 121 and the second internal electrode 122 due to physical or chemical stress.

The dielectric layer 111 may include a barium titanate-based main ingredient.

The barium titanate-based main ingredient is a dielectric base material, has a high dielectric constant, and contributes to forming the dielectric constant of the multilayer ceramic capacitor 100.

Barium titanate-based main ingredient may include, for example, $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof.

The dielectric layer 111 may further include a secondary component. Secondary component may further include, for example, manganese (Mn), chromium (Cr), silicon (Si), aluminum (Al), magnesium (Mg), tin (Sn), antimony (Sb), germanium (Ge), gallium (Ga), indium (In), barium (Ba), lanthanum (La), yttrium (Y), actinium (Ac), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V) or a combination thereof.

Average thickness (average length in the T-axis direction) of the dielectric layer 111 may be 2.0 μm to 8.0 μm, and for example, may be 2.4 μm to 7.8 μm. When the average thickness of the dielectric layer 111 is within the above range, the reliability of the multilayer ceramic capacitor is excellent. As described above, in the scanning electron microscope (SEM) image of the measured cross-sectional sample, the central point of the dielectric layer 111 in the length direction (L-axis direction) or the width direction (W-axis direction) is taken as a reference point, and an arithmetic average value of the thicknesses of the dielectric layer 111 may be obtained for 10 points disposed apart from the reference point by a predetermined interval. The intervals of the 10 points may be adjusted depending on the scale of the SEM image, and may be, for example, 1 μm to 100 μm, 1 μm to 50 μm, or 1 μm to 10 μm. At this time, all 10 points must be positioned within the dielectric layer 111, and if all 10 points are not positioned within the dielectric layer 111, the position of the reference point may be changed, or the interval between the 10 points may be adjusted.

The internal electrode layers 121 and 122, that is, the first internal electrode 121 and the second internal electrode 122 are electrodes having different polarities, alternately arranged interposing the dielectric layer 111 to face each other along the T-axis direction, and may have a first end exposed through the third and fourth surfaces of the capacitor body 110, respectively.

The first internal electrode 121 and the second internal electrode 122 may be electrically insulated from each other by the dielectric layer 111 disposed in the middle.

End portions of the first internal electrode 121 and the second internal electrode 122 alternately exposed through the third and fourth surfaces of the capacitor body 110 may be electrically connected to the first external electrode 131 and the second external electrode 132, respectively.

The first internal electrode 121 and the second internal electrode 122 may include a conductive metal, for example, a metal such as Ni, Cu, Ag, Pd, Au, or an alloy thereof, such as an Ag—Pd alloy.

Additionally, the first internal electrode 121 and the second internal electrode 122 may include dielectric particles of the same composition as the ceramic material included in the dielectric layer 111.

The first internal electrode 121 and the second internal electrode 122 may be formed using a conductive paste including a conductive metal. The printing method of the conductive paste may be a screen printing method or a gravure printing method.

The average thickness of the first internal electrode 121 and the second internal electrode 122 may be 0.1 μm to 2 μm. The average thickness of the first internal electrode 121 and the second internal electrode 122 may be measured by the SEM analysis. Here, since the SEM analysis is the same as the method for measuring the average thickness of the dielectric layer 111 described above, a description thereof will be omitted.

The capacitor body 110 may be formed by firing a stacking structure in which the plurality of dielectric layers 111 and internal electrode layers 121 and 122 are stacked.

Hereinafter, a method of manufacturing the multilayer ceramic capacitor 100 according to an embodiment will be described.

Manufacturing Method of Multilayer Ceramic Capacitor

The multilayer ceramic capacitor 100 according to an embodiment may include applying a first paste for forming the lower layer of the external electrodes 131 and 132 to the surface of the capacitor body 110 including the dielectric layer 111 and the internal electrode layers 121 and 122, the lower layer including a first glass; forming the lower layers 10 and 30 by sintering the first paste; applying a second paste for forming the upper layer of the external electrodes 131 and 132 on the lower layers 10 and 30 of the external electrodes 131 and 132, the upper layer including a second glass; and forming the upper layers 20 and 40 by sintering the second paste.

In addition, the multilayer ceramic capacitor 100 according to an embodiment may include applying a first paste for forming the lower layer of the external electrodes 131 and 132 to the surface of the capacitor body 110 including the dielectric layer 111 and the internal electrode layers 121 and 122, the lower layer including a first glass; applying a second paste for forming the upper layer of the external electrodes 131 and 132 on the first paste, the upper layer including a second glass; and forming the external electrodes 131 and 132 including the lower layers 10 and 30 and the upper layers 20 and 40 by sintering the capacitor body applied with the first paste and the second paste.

First, a method of preparing the capacitor body 110 will be described.

The capacitor body 110 may be manufactured through the process of manufacturing the dielectric green sheet by using a dielectric slurry and forming the conductive paste layer on the surface of the dielectric green sheet; manufacturing the dielectric green sheet stack; and firing the dielectric green sheet stack by stacking the dielectric green sheet formed with the conductive paste layer.

The dielectric slurry may be prepared by mixing barium titanate-based main ingredient powder, and optionally, secondary component powder.

Since the barium titanate-based main ingredient powder is the same as the barium titanate-based main ingredient contained in the dielectric layer, its description is omitted here.

The secondary component powder may include, for example, manganese (Mn), chromium (Cr), silicon (Si), aluminum (Al), magnesium (Mg), tin (Sn), antimony (Sb), germanium (Ge), gallium (Ga), indium (In), barium (Ba), lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), vanadium (V) or a combination thereof, but is not limited thereto. Each of the secondary component powder may be included in an amount of 0.01 parts by mole to 5 parts by mole with respect to barium titanate-based main ingredient powder 100 parts by mole.

The secondary component powder may be used in the form of an oxide or salt compound containing each metal, or may be used in the form of a sol dispersed in an organic solvent.

Additionally, the dielectric slurry may be prepared by additionally mixing additives such as dispersants, binders, plasticizers, lubricants, and antistatic agents, and solvents.

Barium titanate-based main ingredient powder and optionally secondary component powder may be mixed by using a wet ball mill or a stirred mill. When using the zirconia balls in the wet ball mill, a plurality of zirconia balls with a diameter of 0.1 mm to 10 mm may be used for wet mixing for 8 hours to 48 hours, or 10 hours or 24 hours.

The prepared the dielectric slurry is formed into a dielectric layer after firing.

As a method of molding the prepared the dielectric slurry into a sheet shape, a tape molding method such as a doctor blade method, a calender roll method, etc. may be used, for example, an on-roll molding coater with a head discharge method, and a dielectric green sheet may be obtained by drying the molded body afterward.

To form the conductive paste layer that becomes the internal electrode layer after firing, a conductive paste may be prepared by mixing a conductive powder made of a conductive metal or an alloy thereof, a binder, and a solvent. Additionally, barium titanate powder may be mixed together as a co-material if necessary. The co-material may act to suppress sintering of the conductive powder during the firing process. The conductive paste layer is formed by applying a conductive paste to the surface of the dielectric green sheet in a predetermined pattern using various printing methods such as screen printing or transfer methods.

The conductive powder may include nickel (Ni) or a nickel (Ni) alloy.

Next, a dielectric green sheet stacking structure is prepared by stacking a plurality of layers of dielectric green sheets on which internal electrode patterns are formed, and then pressing the plurality of layers of dielectric green sheets in the stacking direction. At this time, the dielectric green sheet and the internal electrode pattern may be stacked so that the dielectric green sheet is positioned on the upper and lower surfaces of the dielectric green sheet stacking structure in the stacking direction.

The step of cutting the prepared dielectric green sheet stacking structure to a predetermined size by dicing or the like may optionally be performed.

Additionally, the dielectric green sheet stacking structure may be solidified and dried to remove plasticizers, etc., if necessary, and after solidified and dried, the dielectric green sheet stacking structure may be barrel polished using a horizontal centrifugal barrel machine, and the like. In barrel polishing, the dielectric green sheet stacking structure is placed into a barrel container with media and polishing liquid, and rotational motion or vibration is applied to the barrel container, thus unnecessary parts, such as burrs generated during cutting, may be polished. Additionally, after barrel polishing, the dielectric green sheet stacking structure may be washed with a cleaning solution such as water, and dried.

Subsequently, the capacitor body may be prepared after binder removal treatment and firing of the dielectric green sheet stacking structure.

The conditions for binder removal may be appropriately adjusted depending on the components of the dielectric layer or the internal electrode layer. For example, the rate of temperature rise during binder removal treatment may be 5° C./hour to 300° C./hour, the support temperature may be 180° C. to 400° C., and the temperature holding time may be 0.5 hour to 24 hours. The treatment atmosphere of the binder removal may be the air or a reducing atmosphere.

The conditions of the firing treatment may be appropriately adjusted depending on the main ingredient composition of the dielectric layer or the main ingredient composition of the internal electrode. For example, firing may be performed at a temperature of 1100° C. to 1400° C., and may be performed at a temperature of 1200° C. to 1350° C. Additionally, firing may be performed for 0.5 to 8 hours, for example, 1 to 3 hours. Additionally, firing may be performed in a reducing atmosphere, for example, in a humidified mixed gas of nitrogen and hydrogen. When the internal electrode includes nickel (Ni) or a nickel (Ni) alloy, the oxygen partial pressure in the firing sintering atmosphere may be $1.0 \times 10^{-14}$ MPa to $1.0 \times 10^{-10}$ MPa.

After firing, annealing may be performed as needed. Annealing is a treatment to reoxidize the dielectric layer, and annealing may be performed if firing is performed in a reducing atmosphere. The conditions of the annealing treatment may also be appropriately adjusted depending on the components of the dielectric layer. For example, the annealing temperature may be 950° C. to 1150° C., the time may be 0 to 20 hours, and the rate of temperature rise may be 50° C./hour to 500° C./hour. The annealing atmosphere may be a humidified nitrogen gas ($N_2$) atmosphere, and the oxygen partial pressure may be $1.0 \times 10^{-9}$ MPa to $1.0 \times 10^{-5}$ MPa.

In binder removal treatment, firing treatment, or annealing treatment, for example, a wetter may be used to humidify nitrogen gas or mixed gas. In this case, the water temperature may be 5° C. to 75° C. The binder removal treatment, firing treatment, and annealing treatment may be performed sequentially or independently.

Optionally, surface treatment such as sand blasting, laser irradiation, barrel polishing, etc. may be performed on the third and fourth surfaces of the prepare capacitor body 110. By performing this surface treatment, the ends of the first internal electrode and the second internal electrode may be exposed to the outermost surfaces of the third and fourth surfaces, and thus the electrical connection between the first external electrode and the second external electrode, and the first internal electrode and the second internal electrode may be improved, alloy portions may be easily formed.

Hereinafter, a method of preparing the external electrodes 131 and 132 will be described.

The lower layers 10 and 30 are formed by applying and sintering the first paste for forming the lower layer on the first surface of the manufactured capacitor body 110, and subsequently, the second paste for forming the upper layer is applied on the lower layers 10 and 30 and sintered to form the upper layers 20 and 40, such that the external electrodes 131 and 132 may be prepared. In addition, the first paste for forming the lower layer is applied on the first surface of the prepared capacitor body 110, the second paste for forming the upper layer is applied thereon and sintered, thereby forming the lower layers 10 and 30 and the upper layers 20 and 40, such that the external electrodes 131 and 132 may be prepared.

The first paste for forming the lower layer may include a first glass composition that forms the first glass, and the first glass composition may include aluminum oxide ($Al_2O_3$). In addition, the second paste for forming the upper layer may include a second glass composition that forms the second glass, and the second glass composition may include aluminum oxide ($Al_2O_3$).

In more detail, the aluminum oxide ($Al_2O_3$) included in the first paste for forming the lower layer may be included in an amount of more than 0 to 8 parts by mole or less with respect to a total amount of 100 parts by mole of the first glass composition, and for example, may be included in an amount of 0.1 parts by mole to 7.9 parts by mole, for further example, 0.5 parts by mole to 7.7 parts by mole. In addition, the aluminum oxide ($Al_2O_3$) included in the second paste for forming the upper layer may be included in an amount of 10 parts by mole or more to 20 parts by mole or less with respect to a total amount of 100 parts by mole of the second glass composition, and for example, may be included in an amount of 11 parts by mole to 19 parts by mole, for further example, 12 parts by mole to 18 parts by mole. When each of the first paste for forming the lower layer and the second paste for forming the upper layer includes aluminum oxide ($Al_2O_3$) within the content range as the glass component, an external electrode of which not only the contact with the internal electrode is excellent but corrosion resistance and moisture endurance reliability are also excellent by preventing the penetration of moisture and plating solution may be prepared.

The first glass composition of the first paste for forming the lower layer may further include barium oxide (BaO), calcium oxide (CaO), zinc oxide (ZnO), boron oxide ($B_2O_3$), silicon dioxide ($SiO_2$), or a combination thereof.

Barium oxide (BaO) may be included in an amount of 10 parts by mole to 40 parts by mole, with respect to the total amount of 100 parts by mole of the first glass composition, and for example, may be included in an amount of 15 parts by mole to 35 parts by mole. Calcium oxide (CaO) may be included in an amount of 1 parts by mole to 20 parts by mole, with respect to the total amount of 100 parts by mole of the first glass composition, and for example, may be included in an amount of 5 parts by mole to 15 parts by mole. Zinc oxide (ZnO) may be included in an amount of 10 parts by mole to 40 parts by mole, with respect to the total amount of 100 parts by mole of the first glass composition, and for example, may be included in an amount of 15 parts by mole to 35 parts by mole. Boron oxide ($B_2O_3$) may be included in an amount of 10 parts by mole to 40 parts by mole, with respect to the total amount of 100 parts by mole of the first glass composition, and for example, may be included in an amount of 15 parts by mole to 35 parts by mole. Silicon dioxide ($SiO_2$) may be included in an amount of 1 parts by mole to 20 parts by mole, with respect to the total amount of 100 parts by mole of the first glass composition, and may be included in an amount of 5 parts by mole to 15 parts by mole. The components as the first glass composition are included within the above content range when the first paste for forming the lower layer is formed, an external electrode that is excellent in both of contact with internal the electrode and corrosion resistance and moisture endurance reliability may be prepared.

The second glass composition of the second paste for forming the upper layer may further include lithium oxide ($Li_2O$), sodium oxide ($Na_2O$), barium oxide (BaO), calcium oxide (CaO), zinc oxide (ZnO), boron oxide ($B_2O_3$), silicon dioxide ($SiO_2$), iron oxide ($Fe_2O_3$), or a combination thereof.

Lithium oxide ($Li_2O$) may be included in an amount of 1 parts by mole to 20 parts by mole, with respect to the total amount of 100 parts by mole of the second glass composition, and for example, may be included in an amount of 5 parts by mole to 15 parts by mole. Sodium oxide ($Na_2O$) may be included in an amount of 1 parts by mole to 20 parts by mole, with respect to the total amount of 100 parts by mole of the second glass composition, and for example, may be included in an amount of 3 parts by mole to 15 parts by mole. Barium oxide (BaO) may be included in an amount of 10 parts by mole to 40 parts by mole, with respect to the total amount of 100 parts by mole of the second glass composition, and may be included in an amount of 15 parts by mole to 35 parts by mole. Calcium oxide (CaO) may be included in an amount of 1 parts by mole to 20 parts by mole, with respect to the total amount of 100 parts by mole of the second glass composition, and for example, may be included in an amount of 5 parts by mole to 15 parts by mole. Zinc oxide (ZnO) may be included in an amount of 1 parts by mole to 20 parts by mole, with respect to the total amount of 100 parts by mole of the second glass composition, and for example, may be included in an amount of 5 parts by mole to 15 parts by mole. Boron oxide ($B_2O_3$) may be included in an amount of 10 parts by mole to 40 parts by mole, with respect to the total amount of 100 parts by mole of the second glass composition, and for example, may be included in an amount of 15 parts by mole to 35 parts by mole. Silicon dioxide ($SiO_2$) may be included in an amount of 1 parts by mole to 20 parts by mole, with respect to the total amount of 100 parts by mole of the second glass composition, and may be included in an amount of 5 parts by mole to 15 parts by mole. Iron oxide ($Fe_2O_3$) may be included in an amount of 0.1 parts by mole to 10 parts by mole, with respect to the total amount of 100 parts by mole of the second glass composition, and may be included in an amount of 0.5 parts by mole to 5 parts by mole. The components as the second glass composition are included within the above content range when the second paste for forming the upper layer is formed, an external electrode that is excellent in both of contact with internal the electrode and corrosion resistance and moisture endurance reliability may be prepared.

At least one of the first paste for forming the lower layer and the second paste for forming the upper layer may further include a conductive metal. That is, one of the first paste for forming the lower layer and the second paste for forming the upper layer may include the conductive metal, and all of the first paste for forming the lower layer and the second paste for forming the upper layer may include the conductive metal.

Conductive metal may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, may include copper (Cu) or a copper (Cu) alloy.

As an example, the conductive metal included in the paste for forming the lower layer may be included in an amount of 80 wt % to 99 wt % based on the total amount of the paste for forming the lower layer, and the conductive metal included in the paste for forming the upper layer may be included an amount of 80 wt % to 99 wt % based on the total amount of the paste for forming the upper layer.

At least one of the first paste for forming the lower layer and the second paste for forming the upper layer may further include binder, solvent, dispersing agent, plasticizer, oxide powder, or the like.

The binder may be, for example, ethylcellulose, acrylic, butyral, etc., and the solvent may be, for example, an organic solvent or aqueous solvent such as terpineol, butylcarbitol, alcohol, methyl ethyl ketone, acetone, toluene, and the like.

Methods for applying the first paste for forming the lower layer on the outer surface of the capacitor body 110 may include various printing methods such as dip method and screen printing, application method using a dispenser, etc., and spraying method using spray. The first paste for forming the lower layer may be applied to at least the third and fourth surfaces of the capacitor body 110, and optionally applied to a part of the first, second, fifth, or the sixth surfaces on which the band portions of the first and second external electrodes are formed.

Sintering may be performed at a temperature of 700° C. to 1000° C. for 0.1 hour to 3 hours.

Optionally, the conductive resin layer may be formed by applying and curing a paste for forming the conductive resin layer on the outer surface of the capacitor body 110 where the upper layers 20 and 40 are formed on the lower layers 10 and 30.

The paste for forming the conductive resin layer may include a resin and, optionally, a conductive metal or a non-conductive filler. Since the description of the conductive metal and resin is the same as described above, repetitive description will be omitted. Additionally, the paste for forming the conductive resin layer may optionally include a binder, solvent, dispersant, plasticizer, oxide powder, and the like. The binder may be, for example, ethylcellulose, acrylic, butyral, etc., and the solvent may be an organic solvent or aqueous solvent such as terpineol, butylcarbitol, alcohol, methyl ethyl ketone, acetone, and toluene.

For example, the conductive resin layer may be formed by dipping the capacitor body 110 in the paste for forming the conductive resin layer and then curing it, or by printing the paste for forming the conductive resin layer on the surface of the capacitor body 110 by a screen printing method or a gravure printing method, or by applying the paste for forming the conductive resin layer to the surface of the capacitor body 110 and then curing it.

Next, a plating layer may be formed on the outside of the conductive resin layer.

For example, the plating layer may be formed by a plating method, sputtering, or electrolytic plating (electric deposition).

The above-described embodiments will be described in more detail through Examples below. However, the following examples are for illustrative purposes only and do not limit the scope of appended claims.

(Manufacturing of Multilayer Ceramic Capacitor)

Example 1

After manufacturing the dielectric green sheet by using barium titanate ($BaTiO_3$) main ingredient powder, the conductive paste layer including nickel (Ni) is printed on the surface of the dielectric green sheet, and the dielectric green sheet (Width×Depth×Height=3.2 mm×2.5 mm×2.5 mm) where the conductive paste layer is formed is stacked and squeezed, to manufacture the dielectric green sheet stack. A capacitor body was manufactured, as the dielectric green sheet stack was subjected to a plasticizing process at 400° C. or lower in a nitrogen atmosphere, and then fired at a firing temperature of 1300° C. or lower and a hydrogen concentration of 1.0% $H_2$ or lower.

The first paste for forming the lower layer including Cu and the first glass composition containing the composition of the following Table 1 is applied on the surface of the capacitor body, and then sintered at 730° C. for 1 hour to form the lower layer of the external electrode. Herein, based on the total amount of Cu and the first glass composition, Cu is included in an amount of 90 wt % and the first glass composition is included in an amount of 10 wt %. Subsequently, the second paste for forming the upper layer including Cu and the second glass composition containing the composition of the following Table 1 is applied on the formed lower layer, and then sintered at 730° C. for 1 hour to form the upper layer of the external electrode. Herein, based on the total amount of Cu and the second glass composition, Cu is included in an amount of 90 wt % and the second glass composition is included in an amount of 10 wt %. Subsequently, a multilayer ceramic capacitor is manufactured through processes of plating, or the like.

SEM analysis was performed as follows. The multilayer ceramic capacitor 100 manufactured in Example 1 was placed in an epoxy mixture liquid and cured, then polished by using sand paper and diamond suspension, such that a cross-sectional sample having the LT surface to enable observation of the external electrode was obtained. The obtained cross-sectional sample was measured by scanning electron microscope (SEM). SEM was measured, for example, by using Tescan's Vega3, under the condition of 20 KV, 0.2 nA, and analysis magnification of 3 k times.

Figure 5:
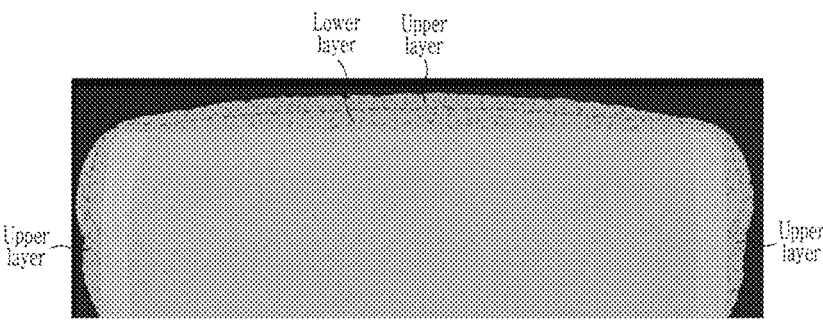
FIG. 5 is a SEM analysis image with respect to an external electrode of a multilayer ceramic capacitor according to Example 1.

FIG. 5 is a SEM analysis image with respect to an external electrode of a multilayer ceramic capacitor according to Example 1.

Referring to FIG. 5, in the case of Example 1 according to an embodiment, it may be confirmed that the external electrode is formed in a bilayer structure of a lower layer and an upper layer on a cross-section of a capacitor body.

Evaluation 2: SEM-EDS Analysis

Figure 6A:
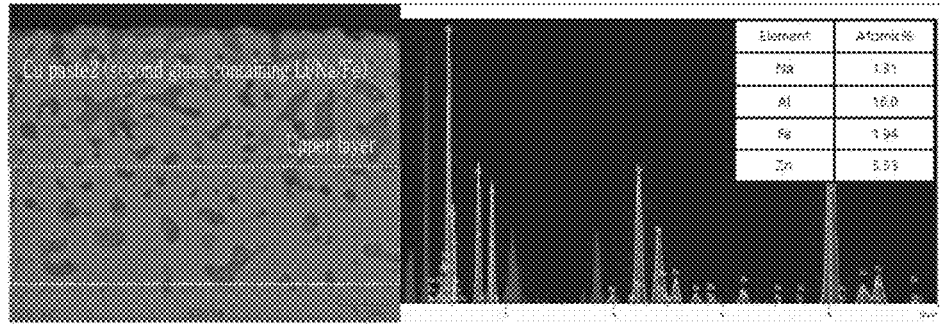
FIG. 6A is a cross-section SEM-EDS analysis image with respect to an upper layer of an external electrode according to Example 1.
Figure 6B:
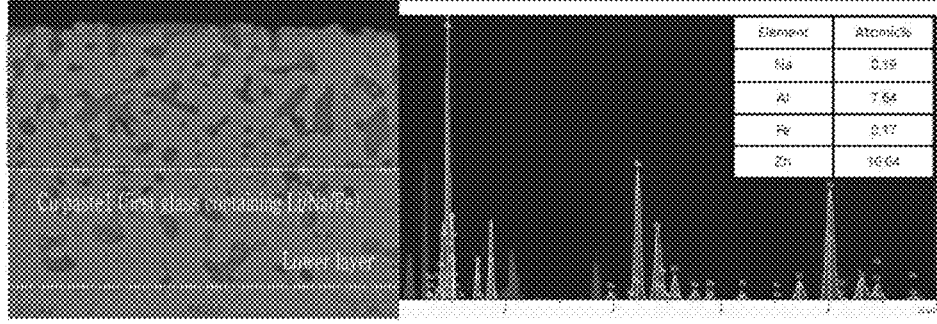
FIG. 6B is a cross-section SEM-EDS analysis image with respect to an lower layer of an external electrode according to Example 1.

Scanning electron microscope-energy dispersive spectroscopy (SEM-EDS) analysis is performed on the multilayer ceramic capacitor manufactured in Example 1, and the results are shown in FIG. 6A and FIG. 6B.

SEM-EDS analysis was performed as follows. The multilayer ceramic capacitor 100 manufactured in Example 1 was placed in an epoxy mixture liquid and cured, then polished by using sand paper and diamond suspension, such

TABLE 1

| The unit is parts by mole with respect to a total amount of 100 parts by mole of each the first glass composition and the second glass composition. | | | | | | | | | |
| --- | --- | --- | --- | --- | --- | --- | --- | --- | --- |
| | $Li_2O$ | $Na_2O$ | BaO | CaO | ZnO | $Al_2O_3$ | $B_2O_3$ | $SiO_2$ | $SnO_2$ | $Fe_2O_3$ |
| (lower layer) first glass composition | — | — | 28.2 | 8.6 | 28.2 | 3.8 | 24.0 | 7.2 | — | — |
| (upper layer) second glass composition | 9.1 | 5.1 | 23.2 | 10.1 | 6.1 | 10.6 | 20.2 | 12.6 | 1.0 | 2.0 |

Comparative Example 1

Except that a paste for forming the external electrode including Cu and glass composition containing the composition of the following Table 2 is applied on the surface of the capacitor body, and sintered at 730° C. for 1 hour to form the external electrode, a multilayer ceramic capacitor is manufactured in the same method as Example 1. Herein, based on the total amount of Cu and the glass composition, Cu is included in an amount of 90 wt % and the glass composition is included in an amount of 10 wt %.

that a cross-sectional sample having the LT surface to enable observation of the external electrode was obtained. The obtained cross-sectional sample was measured by scanning electron microscope (SEM). SEM was measured, for example, by using Tescan's Vega3, under the condition of 20 kV, 0.2 nA, and analysis magnification of 6005 times. Subsequently, in the SEM image of the measured cross-sectional sample, by performing energy dispersive spectroscopy (EDS) analysis, content of each component present in the lower layer and upper layer of the external electrode was confirmed.

TABLE 2

| The unit is parts by mole with respect to a total amount of 100 parts by mole of glass composition. | | | | | | | | | |
| --- | --- | --- | --- | --- | --- | --- | --- | --- | --- |
| | $Li_2O$ | $Na_2O$ | BaO | CaO | ZnO | $Al_2O_3$ | $B_2O_3$ | $SiO_2$ | $SnO_2$ | $Fe_2O_3$ |
| (single layer) Glass composition | 9.1 | 5.1 | 23.2 | 10.1 | 6.1 | 10.6 | 20.2 | 12.6 | 1.0 | 2.0 |

Evaluation 1: SEM Analysis

Scanning electron microscope (SEM) analysis is performed on the multilayer ceramic capacitor manufactured in Example 1, and the results are shown in FIG. 5.

FIG. 6A is a cross-section SEM-EDS analysis image with respect to an upper layer of an external electrode according to Example 1. FIG. 6B is a cross-section SEM-EDS analysis image with respect to an lower layer of an external electrode according to Example 1.

Referring to FIG. 6A and FIG. 6B, in the case of Example 1 according to an embodiment, it may be seen that the first glass included in the lower layer of the external electrode includes aluminum (Al) in an amount of 7.64 atom %, and the second glass included in the upper layer of the external electrode includes aluminum (Al) in an amount of 16 atom %.

Evaluation 3: SEM Analysis

Scanning electron microscope (SEM) analysis was performed on the multilayer ceramic capacitors manufactured in Example 1 and Comparative Example 1, to measure thickness of the external electrode at the central portion and the corner portion, and the results are shown FIG. 7A and FIG. 7B and Table 3 below.

SEM analysis was performed in the same method as Evaluation 1. In the obtained SEM image of the external electrode, the central point of the length of the multilayer ceramic capacitor in the thickness direction (T-axis direction) is defined as the central portion A, and the corner point of the multilayer ceramic capacitor is defined as the corner portion B.

Figure 7A:
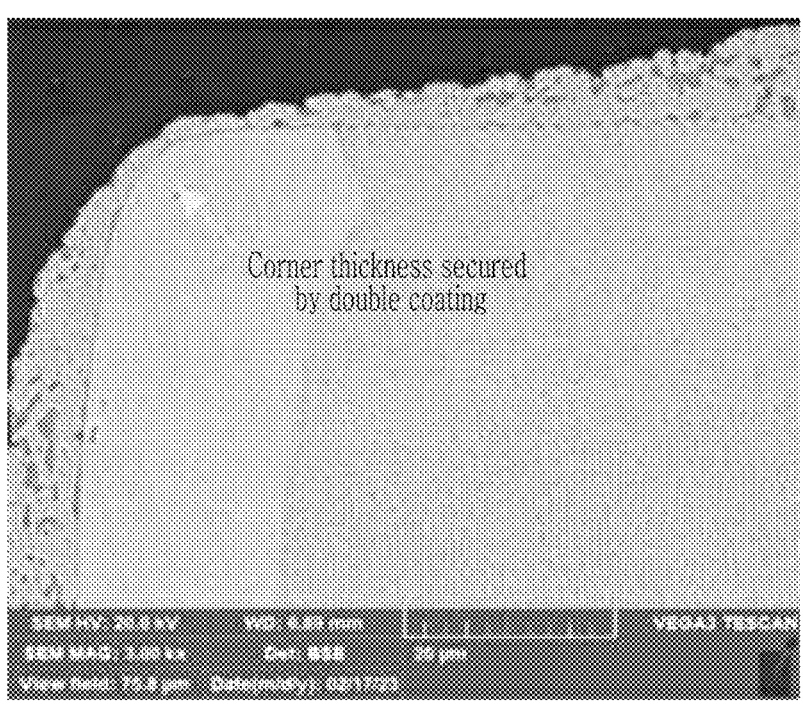
FIG. 7A is a cross-section SEM-EDS analysis image with respect to an external electrode of a multilayer ceramic capacitor according to Example 1.

FIG. 7A is a cross-section SEM-EDS analysis image with respect to an external electrode of a multilayer ceramic capacitor according to Example 1. FIG. 7B is a cross-section SEM-EDS analysis image with respect to an external electrode of a multilayer ceramic capacitor according to Comparative Example 1.

TABLE 3

|  | Central thickness (μm) | Corner thickness (μm) |
| --- | --- | --- |
| Comparative Example 1 | 18 | 1.54 |
| Example 1 | 17.7 | 2.37 |

Figure 7B:
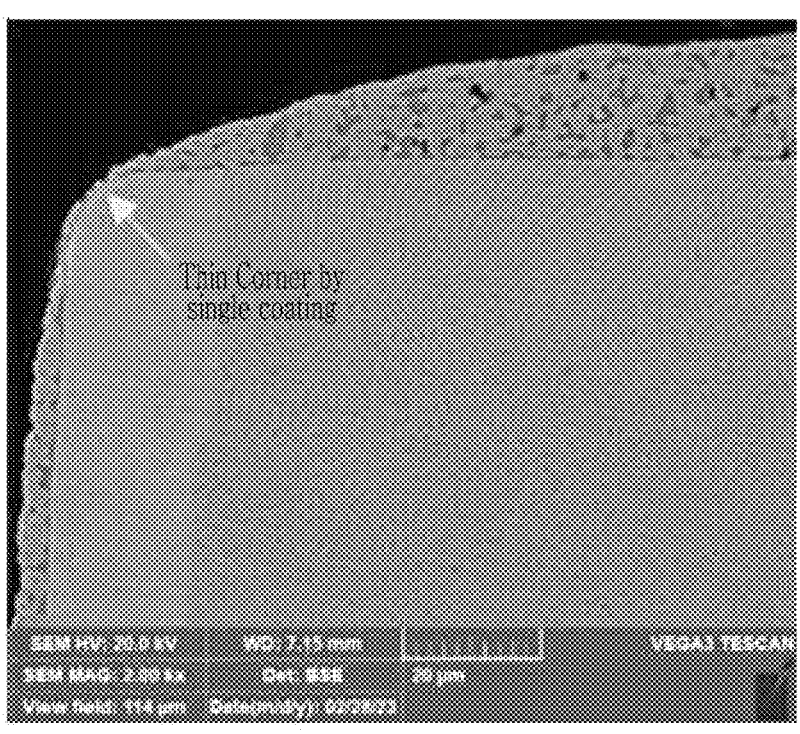
FIG. 7B is a cross-section SEM-EDS analysis image with respect to an external electrode of a multilayer ceramic capacitor according to Comparative Example 1.

Referring to the Table 3 and FIG. 7A and FIG. 7B, in the case of Example 1 according to an embodiment, it may be seen that the thickness at the corner portion of the external electrode is increased compared to Comparative Example 1.

Evaluation 4: EPMA Analysis

Figure 8:
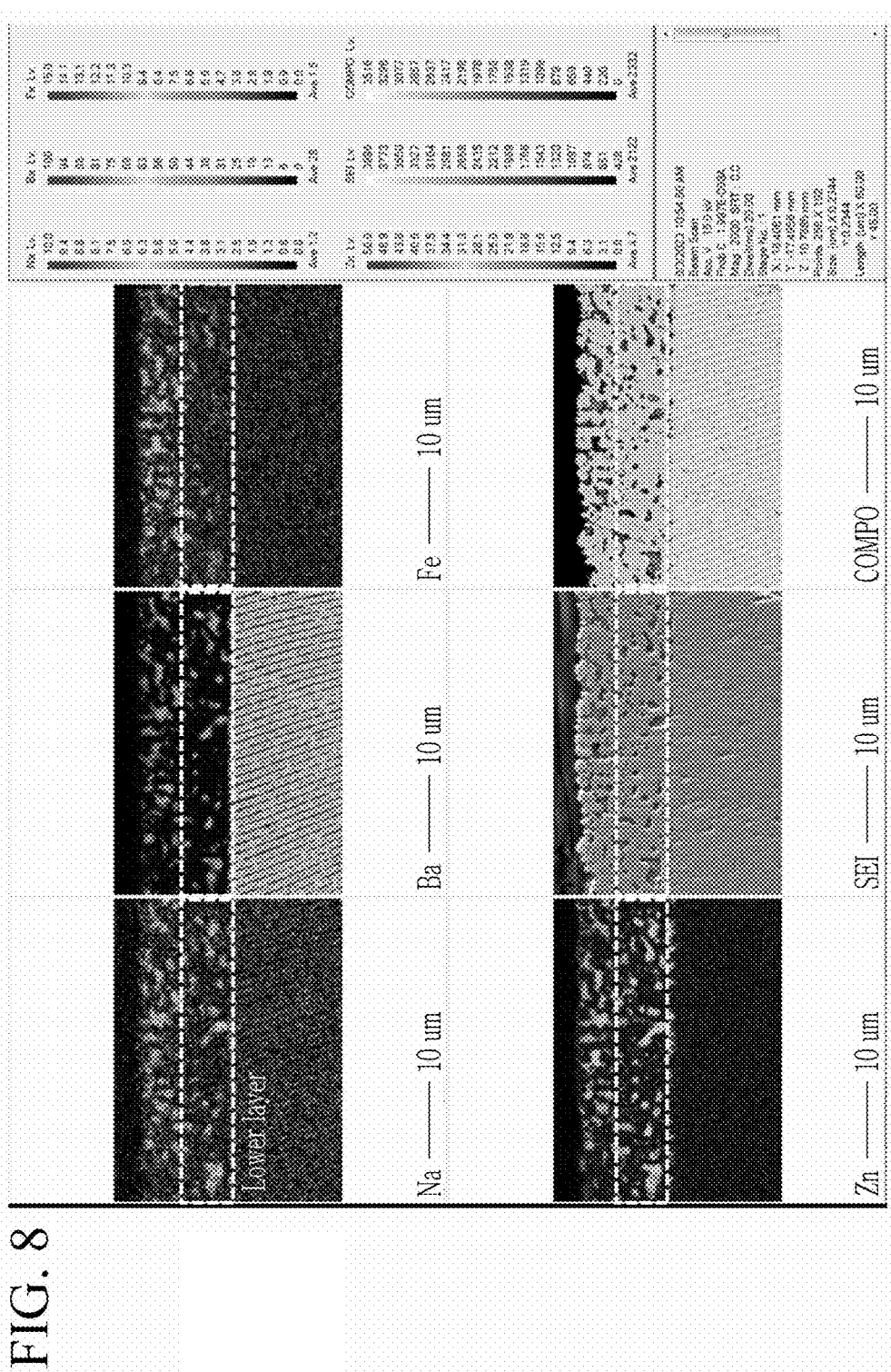
FIG. 8 is a cross-section EPMA analysis image with respect to an external electrode of a multilayer ceramic capacitor according to Example 1.

Electron probe micro-analyzer (EPMA) analysis was performed on the multilayer ceramic capacitor manufactured in Example 1, and the results are shown in FIG. 8 and Table 4 below.

EPMA analysis was performed as follows. The multilayer ceramic capacitor 100 manufactured in Example 1 was placed in an epoxy mixture liquid and cured, then polished by using sand paper and diamond suspension, such that a cross-sectional sample having the LT surface to enable observation of the external electrode was obtained. Electron probe micro-analyzer (EPMA) analysis was measured on the obtained cross-sectional sample under the condition of a voltage of 15 kV and 10 k magnification. Measurement result, mapping and content of each element existing in the lower layer and the upper layer of the external electrode was confirmed.

FIG. 8 is a cross-section EPMA analysis image with respect to an external electrode of a multilayer ceramic capacitor according to Example 1.

TABLE 4

The unit is atom % with respect to the total amount of components of the first glass and the second glass, respectively.

|  | Na | Ba | Fe | Zn |
| --- | --- | --- | --- | --- |
| (lower layer) First glass | 2.92 | 59.4 | 0.86 | 34.2 |

TABLE 4-continued

The unit is atom % with respect to the total amount of components of the first glass and the second glass, respectively.

|  | Na | Ba | Fe | Zn |
| --- | --- | --- | --- | --- |
| (upper layer) Second glass | 6.11 | 70.4 | 4.16 | 19.3 |

Referring to the Table 4 and FIG. 8, in the case of Example 1, it may be confirmed that sodium (Na) and iron (Fe) are present as the second glass component included in the upper layer of the external electrode.

Meanwhile, sodium (Na) and iron (Fe) detected in small amounts in the lower layer of the external electrode are understood as components derived from sodium oxide ($Na_2O$) and iron oxide ($Fe_2O_3$) added when forming the upper layer of the external electrode and diffused into the lower layer.

Evaluation 5: Moisture Endurance Reliability

Figure 9A:
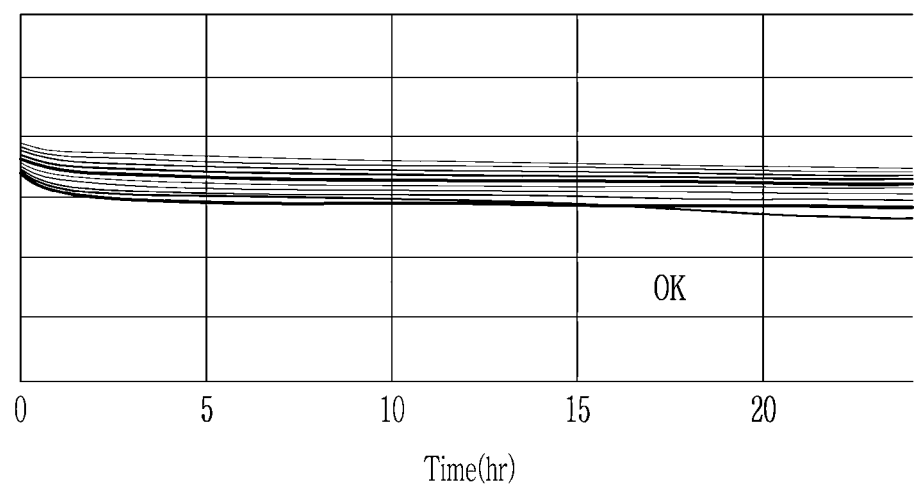
FIG. 9A is a graph showing moisture endurance reliability with respect to an external electrode according to Example 1.
Figure 9B:
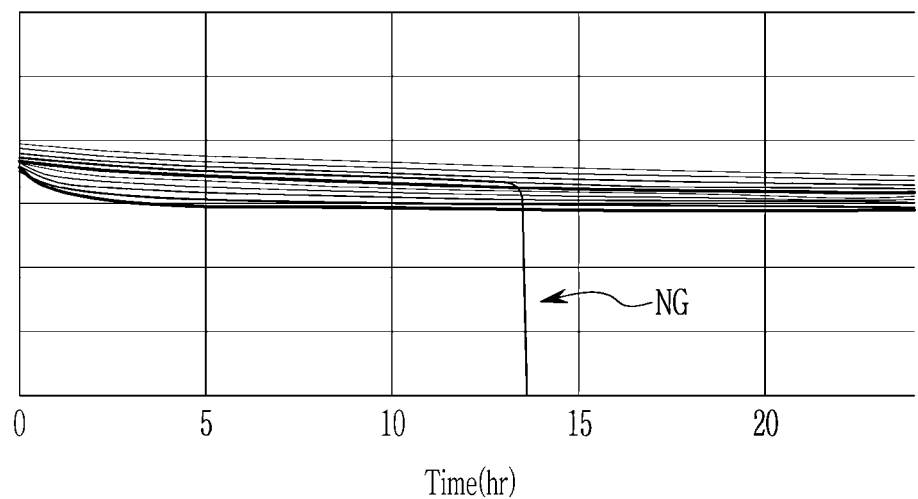
FIG. 9B is a graph showing moisture endurance reliability with respect to an external electrode according to Comparative Example 1.

Moisture endurance reliability was measure with respect to the multilayer ceramic capacitors manufactured in Example 1 and Comparative Example 1, and the results are shown in FIGS. 9A and 9B.

In more detail, ten multilayer ceramic capacitors manufactured in Example 1 and Comparative Example 1, respectively, are prepared and mounted on a measurement substrate, and measurement was made under the condition of 85° C., relative humidity (R.H.) 85%, 6.3V and 24 hours by using ESPEC (PR-3J, 8585) equipment.

FIG. 9A is a graph showing moisture endurance reliability with respect to an external electrode according to Example 1. FIG. 9B is a graph showing moisture endurance reliability with respect to an external electrode according to Comparative Example 1.

Referring to FIG. 9A and FIG. 9B, it may be seen that, in the case of Example 1, where the external electrode is formed as a bilayer and Al is included in the lower layer and the upper layer in different atom % according to an embodiment, moisture endurance reliability was excellent compared to Comparative Example 1 formed in a single layer.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayer ceramic capacitor, comprising:
a capacitor body comprising a dielectric layer and an internal electrode layer; and
an external electrode disposed outside the capacitor body;
wherein the external electrode comprises a lower layer positioned on a cross-section of the capacitor body to be electrically connected to the internal electrode layer, and an upper layer to cover the lower layer and positioned on the lower layer,
wherein the lower layer comprises a first glass that comprises aluminum (Al) in an amount of more than 0 atom % to 8 atom % or less with respect to a total amount of components of the first glass, and
wherein the upper layer comprises a second glass that comprises aluminum (Al) in an amount of 10 atom % or more to 20 atom % or less with respect to a total amount of components of the second glass.

2. The multilayer ceramic capacitor of claim 1, wherein a ratio of the amount of aluminum (Al) comprised in the second glass to the amount of aluminum (Al) comprised in the first glass is more than 2 to 100.

3. The multilayer ceramic capacitor of claim 1, wherein the second glass further comprises lithium (Li), sodium (Na), iron (Fe), barium (Ba), calcium (Ca), zinc (Zn), boron (B), silicon (Si), tin (Sn) or a combination thereof.

4. The multilayer ceramic capacitor of claim 3, wherein:
the second glass comprises silicon (Si); and
a sum of components of aluminum (Al) and silicon (Si) is 20 atom % to 50 atom % with respect to the total amount of components of the second glass.

5. The multilayer ceramic capacitor of claim 1, wherein the first glass further comprises lithium (Li), sodium (Na), iron (Fe), barium (Ba), calcium (Ca), zinc (Zn), boron (B), silicon (Si), tin (Sn) or a combination thereof.

6. The multilayer ceramic capacitor of claim 5, wherein:
the first glass comprises barium (Ba) and zinc (Zn); and
a sum of components of barium (Ba) and zinc (Zn) is 50 atom % to 95 atom % with respect to the total amount of components of the first glass.

7. The multilayer ceramic capacitor of claim 1, wherein:
the first glass and the second glass further comprise sodium (Na); and
an atomic ratio of sodium (Na) comprised in the second glass to sodium (Na) comprised in the first glass is more than 2 to 100 or less.

8. The multilayer ceramic capacitor of claim 1, wherein:
the first glass and the second glass further comprises iron (Fe); and
an atomic ratio of iron (Fe) comprised in the second glass to iron (Fe) comprised in the first glass is more than 2 to 100 or less.

9. The multilayer ceramic capacitor of claim 1, wherein at least one of the lower layer and the upper layer further comprises a conductive metal.

10. The multilayer ceramic capacitor of claim 9, wherein the conductive metal comprises copper (Cu), nickel (Ni), silver (Ag), palladium (Pd), gold (Au), platinum (Pt), tin (Sn), tungsten (W), titanium (Ti), lead (Pb), an alloy thereof, or a combination thereof.

11. The multilayer ceramic capacitor of claim 1, wherein the external electrode includes (i) a central portion that includes a central point of a length of the multilayer ceramic capacitor in thickness direction and (ii) a corner portion that includes a corner point of the multilayer ceramic capacitor, and a thickness ratio of corner portion compared to central portion of the external electrode is 0.1 to 0.5.

12. The multilayer ceramic capacitor of claim 3, wherein the second glass comprises lithium (Li).

13. The multilayer ceramic capacitor of claim 12, wherein the first glass further comprises lithium (Li); and
an atomic ratio of lithium (Li) comprised in the second glass to lithium (Li) comprised in the first glass is more than 1.

14. A method of manufacturing a multilayer ceramic capacitor, the manufacturing method comprising:
applying a first paste for forming a lower layer of an external electrode to a surface of a capacitor body comprising a dielectric layer and an internal electrode layer, the lower layer comprising a first glass;
forming the lower layer by sintering the first paste;
applying a second paste for forming an upper layer of the external electrode on the lower layer, the upper layer comprising a second glass; and
forming the upper layer by sintering the second paste, wherein the first paste includes a first glass composition that forms a first glass, and the first glass composition comprises aluminum oxide ($Al_2O_3$) in an amount of more than 0 parts by mole to 8 parts by mole or less with respect to a total amount of 100 parts by mole of the first glass composition; and
wherein the second paste includes a second glass composition that forms a second glass, and the second glass composition comprises aluminum oxide ($Al_2O_3$) in an amount of 10 parts by mole or more to 20 parts by mole or less with respect to a total amount of 100 parts by mole of the second glass composition.

15. A method of manufacturing a multilayer ceramic capacitor, the manufacturing method comprising:
applying a first paste for forming a lower layer of an external electrode to a surface of a capacitor body comprising a dielectric layer and an internal electrode layer, the lower layer comprising a first glass;
applying a second paste for forming an upper layer of the external electrode on first the paste, the upper layer comprising a second glass; and
forming the external electrode comprising the lower layer and the upper layer by sintering the capacitor body applied with the first paste and the second paste,
wherein the first paste includes a first glass composition that forms a first glass, and the first glass composition comprises aluminum oxide ($Al_2O_3$) in an amount of more than 0 parts by mole to 8 parts by mole or less with respect to a total amount of 100 parts by mole of the first glass composition, and
wherein the second paste includes a second glass composition that forms a second glass, and the second glass composition comprises aluminum oxide ($Al_2O_3$) in an amount of 10 parts by mole or more to 20 parts by mole or less with respect to a total amount of 100 parts by mole of the second glass composition.

16. The method of manufacturing the multilayer ceramic capacitor of claim 14, wherein the first glass composition further comprises barium oxide (BaO), calcium oxide (CaO), zinc oxide (ZnO), boron oxide ($B_2O_3$), silicon dioxide ($SiO_2$), or a combination thereof.

17. The method of manufacturing the multilayer ceramic capacitor of claim 16, wherein, with respect to the total amount of 100 parts by mole of the first glass composition:
barium oxide (BaO) is comprised in an amount of 10 parts by mole to 40 parts by mole;
calcium oxide (CaO) is comprised in an amount of 1 part by mole to 20 parts by mole;
zinc oxide (ZnO) is comprised in an amount of 10 parts by mole to 40 parts by mole;
boron oxide ($B_2O_3$) is comprised in an amount of 10 parts by mole to 40 parts by mole; and
silicon dioxide ($SiO_2$) is comprised in an amount of 1 part by mole to 20 parts by mole.

18. The method of manufacturing the multilayer ceramic capacitor of claim 14, wherein the second glass composition further comprises lithium oxide ($Li_2O$), sodium oxide ($Na_2O$), barium oxide (BaO), calcium oxide (CaO), zinc oxide (ZnO), boron oxide ($B_2O_3$), silicon dioxide ($SiO_2$), iron oxide ($Fe_2O_3$), or a combination thereof.

19. The method of manufacturing the multilayer ceramic capacitor of claim 18, wherein, with respect to the total amount of 100 parts by mole of the second glass composition:
lithium oxide ($Li_2O$) is comprised in an amount of 1 part by mole to 20 parts by mole;

sodium oxide (Na$_2$O) is comprised in an amount of 1 part by mole to 20 parts by mole;

barium oxide (BaO) is comprised in an amount of 10 parts by mole to 40 parts by mole;

calcium oxide (CaO) is comprised in an amount of 1 part by mole to 20 parts by mole;

zinc oxide (ZnO) is comprised in an amount of 1 part by mole to 20 parts by mole;

boron oxide (B$_2$O$_3$) is comprised in an amount of 10 parts by mole to 40 parts by mole;

silicon dioxide (SiO$_2$) is comprised in an amount of 1 part by mole to 20 parts by mole; and iron oxide (Fe$_2$O$_3$) is comprised in an amount of 0.1 part by mole to 10 parts by mole.

20. The method of manufacturing the multilayer ceramic capacitor of claim 14, wherein at least one of the first paste and the second paste further comprises a conductive metal.

\* \* \* \* \*